Patented May 19, 1936

2,040,818

UNITED STATES PATENT OFFICE 2,040,818

COATED DIATOMACEOUS EARTH PRODUCT AND METHOD OF MAKING THE SAME

Marion S. Badollet, Fanwood, N. J., assignor to Johns-Manville Corporation, New York, N. Y., a corporation of New York No Drawing. Application July 29, 1932, Serial No. 626,207

9 Claims. (Cl. 210—203)

This invention relates to a coated diatomaceous earth product and a method of making the same.

The invention comprises pulverulent compositions of diatomaceous earth particles coated with an acid-resistant, alkali-resistant, and water-resistant material. A preferred embodiment of the invention is a pulverulent composition adapted for use in filtering a liquid and containing particles of diatomaceous earth coated with a material that is not wetted by the said liquid and is not soluble therein or affected thereby.

Materials which are particularly adapted for use in connection with the present invention, as the base to which the coating may be applied, include the following: comminuted diatomaceous earth, say, of quality suitable for use as a filter aid, and diatomaceous earth of the same quality that has been calcined in comminuted form at a temperature of approximately 1000° C., either alone or in the presence of a small proportion of a chemical adapted to flux clay present in commercial grades of diatomaceous earth at the temperature of calcination, as, for example, with sodium chloride, in the proportion of 5 parts by weight of sodium chloride to each 100 parts of comminuted diatomaceous earth.

Briefly stated, a method by which the products of the present invention may be made includes applying, to the particles that are to be coated, a composition containing a material adapted to be hardened and then hardening the material in situ, as, for example, by subjecting the coated particles to an elevated temperature to cause polymerization of heat-polymerizable material. The material may be applied in a volatile diluent, as in the form of a solution or an emulsion, or by being formed upon the surface of the particles being coated. If volatile substances are associated with the coating material as applied, the volatile material may be removed as a preliminary or essential step in the hardening of the coating material. Thus, the volatile substances may be removed by volatilization. Before the volatilization is completed but after it has progressed to the extent that further volatilization is not accompanied by pronounced migration of non-volatile material present in the solution or emulsion, the mixture of base and coating material may be thoroughly mixed, as by gentle milling, to redistribute the coating material throughout the mixture. Volatilization is then completed.

The hardening may involve other steps, in addition to or as alternatives for the evaporation of volatile solvent or emulsification medium and/or polymerization by heat mentioned above. Thus, the hardening may involve cooling of a material applied in warm, fluent condition and adapted to be solidified or substantially increased in viscosity by cooling.

A product of the present invention and a method of making it are illustrated in the following specific examples.

The proportions of materials are expressed as parts by weight.

Example I

In this example the coating is polymerized material applied initially in heat-polymerizable form. It is applied to diatomaceous earth predominantly in the form of discrete particles, for example, in the presence of a volatile diluent, preferably a solvent. The diluent is then removed, as by volatilization, and the remaining non-volatilized coating material is then hardened by polymerization.

The coating material used may be a water-insoluble, initially polymerizable organic compound selected from the following group: a heat-polymerizable ester of a polybasic organic acid with a polyhydric alcohol, as, for example, a glyceryl phthalate, suitably of the type sold commercially under the name Glyptal, or glycol phthalate or succinate; a derivative of an unsaturated hydrocarbon, such as a vinyl resin or a polymerized divinylacetylene, which is sold commercially under the name "Synthetic Drying Oil"; a polymerizable animal or vegetable oil, such as China-wood oil or linseed oil; a rubber compound; and a polymerizable resin, such as a phenol-aldehyde resin of the Bakelite type or a urea-aldehyde resin.

These materials may be applied, severally, in dispersion in a conventional volatile solvent or emulsification medium therefor, the solvent or medium evaporated, and the non-volatile material, that remains coated on the individual, discrete particles, polymerized in situ, at a temperature that is conventional for such polymerization. Thus, the phenol-aldehyde resin (Bakelite) may be subjected in the final hardening operation to a temperature of approximately 135° C., glyceryl phthalate (Glyptal) to the same temperature, China-wood oil to a temperature between atmospheric and 60° C., for example, polymerized divinylacetylene (Synthetic Drying Oil) to a temperature above atmospheric, and rubber to a usual temperature of vulcanization for the particular rubber compound used. It will be understood that rubber may be used in the form of a "rubber compound" or mixture including a vulcanization material, with or without an accelerator.

The use of the polymerizable coating materials may be illustrated in greater detail by the preparation of a pulverulent diatomaceous earth composition in which the particles are coated with a glyceryl phthalate (Glyptal) varnish containing glycerin phthalate, a volatile solvent therefor, such as a mixture of an aromatic hydrocarbon and a ketone, and suitably also a plasticising or modifying material, such as a limited proportion of a varnish oil. The varnish is first diluted to a low concentration. Into this there is then introduced comminuted diatomaceous earth in such proportion and in such manner that the earth is wetted throughout by the varnish. The excess of varnish is then removed, as by centrifuging or filtration followed by the passage of air through the filter cake. The product so formed is treated to cause evaporation of the volatile material therein, as, for example, by being warmed gradually to a temperature above 80° C., say to 135° C. During this drying the material is stirred, continuously or at intervals, in order to minimize the agglomeration of the non-volatile varnish materials and to insure distribution throughout the entire mixture. Not only are volatile materials removed during this treatment but also the glyceryl phthalate, which initially may have been partially polymerized into a compound of complex formula, is further polymerized and thereby made more stable and inert towards various chemical materials and physical conditions and also somewhat harder than when first deposited from its solution. After this treatment, the coated material may be finally disintegrated, suitably by mild means, into a pulverulent composition in which the particles are individually coated with polymerized material. Thus the coated material may be rubbed through a 30-mesh screen.

In using an olefin polysulfide compound (Thiokol), such as described in U. S. Patent 1,854,480, issued April 19, 1932 to Mnookin, as the coating material, the compound was refluxed with a liquid chlorinated napthalene derivative of specific gravity 1.25 and melting point −3.6° C., and the resulting solution was coated onto comminuted diatomaceous earth. If desired the olefin polysulfide compound may be applied directly to the diatomaceous earth without dilution by the naphthalene derivative. The olefin polysulfide may be formed in situ on diatomaceous earth, by refluxing, say for 30 minutes, a mixture of comminuted diatomaceous earth with a fluid mixture of equal proportions of ethylene dichloride and an alkali polysulfide. There is thus formed a rubberlike coating of water and gasoline-insoluble material around the diatomaceous particles.

In using vinylite resin, the resin may be applied in a solution of 5 parts of the resin in 160 parts of acetone. Polymerized divinylacetylene may be applied in a benzol composition.

*Example II*

A lacquer of the cellulose ester type is used to effect a coating.

Diatomaceous earth is coated with a solution of pyroxylin, for example, in a volatile solvent mixture therefor, such as a mixture of butyl acetate and toluol. The volatile solvent mixture is evaporated from the product to leave the diatomaceous earth coated with a film of pyroxylin, local concentration of non-volatile material from the lacquer being avoided, as described above, by stirring or milling during the evaporation.

*Example III*

Comminuted diatomaceous earth is impregnated with a solution of a chlorinated naphthalene derivative of the type known commercially as halowax and having, for example, a specific gravity of 1.74 (at 150° C.) and melting point of 130° C., paraffin, a cumarone resin, or other acid-resistant, alkali-resistant, water-resistant material of low vapor pressure. The volatile solvent is evaporated from the solution, with precautions to insure even distribution of the coating material and non-tackiness at the temperature at which the product is to be used, and to leave a diatomaceous earth product in which the immiscible, discrete particles are separately coated.

*Example IV*

The particles of finely divided diatomaceous earth are coated with synthetic rubber of the type known as Duprene, comprising polymerized chloroprene and made as described in the Journal of the American Chemical Society 53, 4203–6 (1931). Thus, 60 parts diatomaceous earth filter aid is soaked in a solution of 14 parts of the polymerized chloroprene, in benzol-soluble form, dissolved in 250 parts of benzol, the excess of solution removed, as by filtration, and the remaining impregnated diatomaceous earth subjected to treatment to expel volatile material, as to an evaporation treatment at a temperature of approximately 78° C., while the mixture is being stirred to maintain uniform distribution of the non-volatile material. The product may be dispersed, as, for example, by being rubbed through a 30-mesh screen. The result is a pulverulent diatomaceous composition, in which the individual particles are not wetted by gasoline or cold water.

In the Examples I–IV, there have been described coating materials that are resistant to many chemicals, particularly after the materials have been hardened, as by being subjected to an elevated temperature. Thus, there have been described coating materials that are acid-resistant, alkali-resistant, water-resistant, and not readily wetted by water. When some of these properties, such as acid-resistance, are not desired, the procedure of Example V, below, may be followed.

*Example V*

A water-insoluble compound of naphthenic acid or the like with multivalent metals such as aluminum or zinc, may be intimately associated with particles of diatomaceous earth.

For example, 50 parts of comminuted diatomaceous earth may be impregnated with 80 parts of a solution of 2 ounces of aluminum naphthenate in 1 gallon of gasoline. The impregnated material is dried and mildly disintegrated.

Or, there may be used, as the impregnating material, an aluminum naphthenate solution of the type described above but modified by the addition thereto of rubber latex or crepe rubber, with or without cresylic acid, say, in the proportion of about 3 parts of latex and 3 parts of cresylic acid to each 4 parts of aluminum naphthenate.

The product made as described in Example V is water-repellent but is affected by strong acids, such as hydrochloric acid.

The products of the present invention are useful as filtration materials or filter aids and as fillers.

An example of the use of the products in filtration follows. In the filtration of a petroleum hydrocarbon material, similar to kerosene and known commercially as varnolene, there were used in comparable experiments, first, a filter aid containing diatomaceous earth that had been calcined with a small proportion of a chemical adapted to flux the clay, and, second, filter aid made by treating 2 parts by weight of the said diatomaceous earth with approximately 1.5 parts of a thinned lacquer containing pyroxylin in a volatile solvent mixture. The impregnated material was air-dried, partly dispersed by a mild beating action in a hammer mill, and then dried completely and remilled. Finally, the product was passed through a 100-mesh screen, in order to complete the dispersion and to remove any large particles. When the resulting coated filter aid was used, the rate of filtration of the petroleum hydrocarbon was approximately 2.5 times as fast as with the uncoated filter aid. Also, the coating on the filter aid appeared not to be affected by the hydrocarbon.

In filtering a given liquid, the coating material selected for the filter aid should be one that is not readily wetted by the liquid and is insoluble in the liquid. If the liquid to be filtered is a hydrocarbon, then the coating on the filter aid should be one that possesses these properties when in contact with a hydrocarbon liquid. Thus, the coating material may be polymerized divinylacetylene or a lacquer film containing a high proportion of pyroxylin. When the liquid to be filtered is aqueous, then there may be used a coating material that exhibits the desired properties in the presence of water.

In any case, the coating material should be resistant to the chemical and physical environment to which it is to be subjected during use. The coating material should not soften or be destroyed during use. It should be inert and should not swell, gelatinize, dissolve, or melt under the conditions of use and should have a low vapor pressure, to prevent volatilization during use. Such a product retains its porosity and lightness in weight.

The proportion of coating to base material may be varied within limits. For reasons of economy, a small proportion of coating material is preferred, suitably an amount just sufficient to coat continuously the particles of base. With diatomaceous earth as the base, I have used 3 to 25 parts, suitably not more than 10 parts, of non-volatile coating material for 100 parts of diatomaceous earth.

As the base material to which the water-resistant coating is applied, there may be used diatomaceous earth or the like that has been previously treated to render it electropositive. For example, comminuted diatomaceous earth of one of the grades described above may be treated with an aqueous solution of an aluminum salt, such as aluminum sulphate, the excess of solution removed, say by filtration, and the diatomaceous earth wetted with the solution then treated with an aqueous solution of an alkali, such as sodium or potassium hydroxide. This causes precipitation of aluminum hydroxide as a base coating over the surfaces of the particles of diatomaceous earth. The excess of alkali solution is then removed and the product subjected to a drying operation. After being dried, the material which is now electropositive (when in contact with water) is treated as described under Examples I–V to provide a water-resistant coating.

The use of the electropositive base material is particularly desirable when the water-resistant coating that is to be applied is of electronegative character. In such a case the electronegative coating material is very readily spread over the electropositive base material, possibly because of the dissimilarity of charges and the resulting electrical attraction. Also, in certain cases there may be a chemical reaction between the coating first applied and the water-resistant coating.

When acid resistance is not desired, such a product, in which an electropositive base coating is reacted chemically with an electronegative material, may be made as follows: Particles of diatomaceous earth coated with aluminum hydroxide, as described above, are allowed to fall through an aqueous solution of a soap and to collect at the bottom of the container. The excess soap solution is then removed, as by filtration, and the product is dried at approximately 110° C.

The product of the present invention comprises particles of diatomaceous earth provided with a coating of the kind described, the said particles being predominantly discrete, in distinction from compact block-like objects in which particles of diatomaceous earth may be bonded into a shape-retaining or rigid unit.

Since the details that have been given are for the purpose of illustration and not restriction, many variations therefrom may be made without departing from the spirit and scope of the invention.

What I claim is:

1. A pulverulent composition of matter including diatomaceous earth predominantly in the form of discrete particles and a coating, on the said particles, comprising water-resistant, acid-resistant, and alkali-resistant organic material, the coating composition not more than ten parts by weight to one hundred parts of diatomaceous earth.

2. A pulverulent composition, adapted for use in filtering a liquid, comprising particles predominantly in discrete form and a material coated thereon that is not readily wetted by the said liquid.

3. A filter aid, adapted to filter a liquid, comprising comminuted diatomaceous earth predominantly in the form of discrete particles and an organic coating thereon that is insoluble in and not softened by the said liquid.

4. A filter aid, adapted to filter a liquid, comprising comminuted and then calcined diatomaceous earth predominantly in the form of discrete particles and an organic coating thereon that is insoluble in and not softened by the said liquid.

5. In making a composition of matter comprising base particles coated with water-resistant material, the method which comprises coating the base particles predominantly in discrete form with electropositive material and then with water-resistant material.

6. In making a composition of matter comprising base particles coated with water-resistant material, the method which comprises coating the base particles predominantly in discrete form with electropositive material and then with water-resistant material of electronegative character.

7. A pulverulent composition of matter comprising diatomaceous earth predominantly in the form of discrete particles provided with a base coating that is electropositive and an outer coating that is water-resistant.

8. A pulverulent composition of matter comprising diatomaceous earth predominantly in the form of discrete particles provided with a base coating that is electropositive and an outer coating that is electronegative.

9. A pulverulent composition adapted for use in filtering a liquid comprising particles predominantly in discrete form, and an organic coating thereon that is insoluble in and not softened by the said liquid.

MARION S. BADOLLET.